United States Patent
Jang et al.

(10) Patent No.: US 8,976,743 B2
(45) Date of Patent: Mar. 10, 2015

(54) METHOD AND APPARATUS FOR TRANSMITTING AND RECEIVING RESOURCE ALLOCATION SCHEME INFORMATION IN A WIRELESS COMMUNICATION SYSTEM

(75) Inventors: Jae-Hyuk Jang, Suwon-si (KR); Jung-Je Son, Yongin-si (KR); Kyung-Kyu Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/168,146

(22) Filed: Jun. 24, 2011

(65) Prior Publication Data

US 2011/0317644 A1    Dec. 29, 2011

(30) Foreign Application Priority Data

Jun. 24, 2010    (KR) ........................ 10-2010-0060159

(51) Int. Cl.
| | |
|---|---|
| *H04W 4/00* | (2009.01) |
| *H04W 28/24* | (2009.01) |
| *H04L 1/18* | (2006.01) |
| *H04L 1/00* | (2006.01) |
| *H04W 28/04* | (2009.01) |
| *H04W 28/06* | (2009.01) |
| *H04W 72/04* | (2009.01) |
| *H04W 72/12* | (2009.01) |

(52) U.S. Cl.
CPC .............. *H04W 28/24* (2013.01); *H04L 1/1896* (2013.01); *H04L 1/0017* (2013.01); *H04L 1/0079* (2013.01); *H04L 1/1812* (2013.01); *H04W 28/04* (2013.01); *H04W 28/06* (2013.01); *H04W 72/04* (2013.01); *H04W 72/0413* (2013.01); *H04W 72/042* (2013.01); *H04W 72/12* (2013.01)

USPC .......................................................... 370/329

(58) Field of Classification Search
CPC ....................................................... H04L 1/1896
USPC ....................................... 370/329; 455/404.1
See application file for complete search history.

(56) References Cited

U.S. PATENT DOCUMENTS

| | | | |
|---|---|---|---|
| 6,728,208 B1 * | 4/2004 | Puuskari | 370/230.1 |
| 2006/0221903 A1 * | 10/2006 | Kauranen et al. | 370/331 |

(Continued)

FOREIGN PATENT DOCUMENTS

| | | |
|---|---|---|
| KR | 10-2005-0059629 A | 6/2005 |
| KR | 10-2009-0020866 A | 2/2009 |
| KR | 10-2010-0031060 A | 3/2010 |

OTHER PUBLICATIONS

Park, Giwon et al., Text Proposal on Service Specific Scheduling Control Header, LG Electronics, IEEE C802.16m-10/0471, Apr. 30, 2010, 16.2.2.

(Continued)

*Primary Examiner* — Wei Zhao
(74) *Attorney, Agent, or Firm* — Jefferson IP Law, LLP

(57) ABSTRACT

A method and apparatus for transmitting and receiving a Service Specific Scheduling Control Header (SSSCH) in a wireless communication system are provided, in which the SSSCH includes SSSCH type information and a Quality of Service (QoS) parameter change indicator. The SSSCH type information indicates at least one of a QoS parameter set change request, an ACKnowledgment (ACK) for a QoS parameter set change request, and a Negative ACK (NACK) for a QoS parameter set change request, and the QoS parameter change indicator indicates whether a QoS parameter set will be changed.

26 Claims, 6 Drawing Sheets

(56) References Cited

U.S. PATENT DOCUMENTS

| | | | |
|---|---|---|---|
| 2010/0220673 A1* | 9/2010 | Hui et al. | 370/329 |
| 2010/0246512 A1* | 9/2010 | Kawamura et al. | 370/329 |
| 2012/0064854 A1* | 3/2012 | Youn et al. | 455/404.1 |

OTHER PUBLICATIONS

Wang, Lei, Clean-up of MAC Signaling Header Definitions, InterDigital Communications, LLC, IEEE C802.16m-10/0636r1, May 10, 2009, 16.2.2.1.3.

Kim, Jeongki et al., Proposed Text for Service Specific Scheduling Control Header, LG Electronics, C802.16m-10/0939r1 Jul. 11, 2010, 16.2.2.

Hui, Jie et al., Text Proposal on Service Specific BR Header, Intel, IEE C802.16m-10/0361r2, Mar. 5. 2010, 16.2.2.

Jang et al., Clarifications on Service Specific Scheduling Control Header Format (16.2.2.1.3.3), IEEE C802.16m-10/0851r4 Broadband Wireless Access Working Group, Jul. 12, 2010, pp. 1-5.

Jang et al., Clarifications on Service Specific Scheduling Control Header Format (16.2.2.1.3.3), IEEE C802.16m-10/0851r7 Broadband Wireless Access Working Group, Jul. 13, 2010, pp. 1-5.

\* cited by examiner

METHOD AND APPARATUS FOR TRANSMITTING AND RECEIVING RESOURCE ALLOCATION SCHEME INFORMATION IN A WIRELESS COMMUNICATION SYSTEM

PRIORITY

This application claims priority under 35 U.S.C. §119(a) of a Korean patent application filed in the Korean Intellectual Property Office on Jun. 24, 2010 and assigned Serial No. 10-2010-0060159, the entire contents of which are incorporated herein by reference.

BACKGROUND OF THE INVENTION

1. Field of the Invention

The present invention relates to a method and apparatus for transmitting and receiving resource allocation scheme information in a wireless communication system.

2. Description of the Related Art

Wireless communication systems may be classified according to various criterions. Depending on how total system resources are controlled, wireless communication systems may be divided into distributed communication systems and centralized communication systems. A Wireless Local Area Network (WLAN) is an example of a distributed system, and a legacy system, such as a cellular network, is an example of a centralized system.

In a centralized communication system, a Base Station (BS) or an Advanced BS (ABS) manages all resources. That is, the BS allocates resources to a Mobile Station (MS) or an Advanced MS (AMS) for transmission of uplink data as well as transmission of downlink data. Thus, an MS having been allocated resources for uplink data transmission among MSs within the service area of the BS can transmit its uplink data.

Examples of centralized systems include an Institute of Electrical and Electronics Engineers (IEEE) 802.16m system and an IEEE 802.16e system. The IEEE 802.16m system provides a variety of uplink resource allocation schemes corresponding to the types of uplink data required for various services. The IEEE 802.16e system provides an Unsolicited Grant Service (UGS), a real-time Polling Service (rtPS), an extended rtPS (ertPS), a non-real-time Polling Service (nrtPS), and a Best Effort (BE) service. In addition to the service types, the IEEE 802.16m system can provide an adaptive Grant Polling (aGP) service.

The aGP service is a data service type to which a plurality of Quality of Service (QoS) parameter sets representing resource allocation schemes are applicable. For example, if an MS conducts communication using a Voice over Internet Protocol (VoIP) service, the VoIP service may have different resource allocation periods and different amounts of resources required during a talk spurt as compared to a silence spurt according to an audio CODEC used by the VoIP service. In a case of an Adaptive Multi-Rate (AMR) audio CODEC, about 40 bytes are required every 20 ms for a talk spurt and about 10 bytes are required every 160 ms for a silence spurt. When the MS transmits uplink data using such an AMR audio CODEC, allocating two QoS parameter sets to the MS may reduce unnecessary resource allocation in the wireless communication system.

Specifically, the aGP service defines, for example, a primary QoS parameter set specifying a resource amount and a resource allocation period for a talk spurt and a secondary QoS parameter set specifying a resource amount and a resource allocation period for a silence spurt. Thus, the two resource allocation schemes (i.e., the two QoS parameter sets) are used separately and respectively for the talk spurt and the silence spurt.

Each time a new connection is added for communication between a BS and an MS, the BS and the MS determine an uplink resource allocation scheme for the new connection. For this purpose, they negotiate by exchanging Dynamic Service Addition (DSA) messages. When the BS and the MS agree to use the aGP service, the DSA messages define a primary QoS parameter set and a secondary QoS parameter set.

In the method discussed above, a process to change the QoS parameter sets is to be determined for resource allocation. The IEEE 802.16m system considers two processes for changing QoS parameter sets, that is, MS-initiated adaptation and BS-initiated adaptation.

However, no specific method has been defined in relation to changing a resource allocation scheme in the IEEE 802.16m system. Accordingly, there exists a need for defining a specific resource allocation method in a wireless communication system.

SUMMARY OF THE INVENTION

Aspects of the present invention are to address the above-mentioned problems and/or disadvantages and to provide at least the advantages described below. Accordingly, an aspect of the present invention is to provide a method and apparatus for transmitting resource allocation scheme information in a wireless communication system.

Another aspect of the present invention is to provide a method and apparatus for allocating resources, especially a specific method and apparatus for allocating uplink resources at a Base Station (BS) in a wireless communication system.

Another aspect of the present invention is to provide a method and apparatus for changing a resource allocation scheme at a BS in a wireless communication system.

Another aspect of the present invention is to provide a method and apparatus for sharing the occurrence of the change of a resource allocation scheme between an Mobile Station (MS) and a BS prior to resource allocation of the BS so as to prevent unnecessary resource allocation or an uplink data transmission failure caused by lack of allocated resources in a wireless communication system.

Another aspect of the present invention is to provide a method and apparatus for allocating resources in such a manner that when a BS changes an uplink resource allocation scheme, a resource allocation procedure for receiving a response to a resource allocation scheme change request from an MS can be simplified in a wireless communication system.

A further aspect of the present invention is to provide a format for a message required for a BS to allocate resources to an MS in a wireless communication system.

In accordance with an aspect of the present invention, a method for transmitting a Service Specific Scheduling Control Header (SSSCH) in a wireless communication system is provided. The method includes transmitting the SSSCH including SSSCH type information and a Quality of Service (QoS) parameter change indicator. The SSSCH type information indicates at least one of a QoS parameter set change request, an ACKnowledgment (ACK) for a QoS parameter set change request, and a Negative ACK (NACK) for a QoS parameter set change request, and the QoS parameter change indicator indicates whether a QoS parameter set will be changed.

In accordance with another aspect of the present invention, a method for transmitting an SSSCH in a wireless communication system is provided. The method includes transmitting the SSSCH including minimum grant delay information indicating a minimum delay of a requested grant and Bandwidth Request (BR) size information indicating a size of a BR.

In accordance with another aspect of the present invention, a method for receiving an SSSCH in a wireless communication system is provided. The method includes receiving the SSSCH including SSSCH type information and a QoS parameter change indicator. The SSSCH type information indicates at least one of a QoS parameter set change request, an ACK for a QoS parameter set change request, and a NACK for a QoS parameter set change request, and the QoS parameter change indicator indicates whether a QoS parameter set will be changed.

In accordance with another aspect of the present invention, a method for receiving an SSSCH in a wireless communication system is provided. The method includes receiving the SSSCH including minimum grant delay information indicating a minimum delay of a requested grant and BR size information indicating a size of a BR.

In accordance with another aspect of the present invention, an apparatus for transmitting an SSSCH in a wireless communication system is provided. The apparatus includes a signal Input/Output (I/O) unit for transmitting the SSSCH including SSSCH type information and QoS parameter change indicator. The SSSCH type information indicates at least one of a QoS parameter set change request, an ACK for a QoS parameter set change request, and a NACK for a QoS parameter set change request, and the QoS parameter change indicator indicates whether a QoS parameter set will be changed.

In accordance with another aspect of the present invention, an apparatus for transmitting an SSSCH in a wireless communication system is provided. The apparatus includes a signal I/O unit for transmitting the SSSCH including minimum grant delay information indicating a minimum delay of a requested grant and BR size information indicating a size of a BR.

In accordance with another embodiment of the present invention, an apparatus for receiving an SSSCH in a wireless communication system is provided. The apparatus includes a signal I/O unit for receiving the SSSCH including SSSCH type information and a QoS parameter change indicator. The SSSCH type information indicates at least one of a QoS parameter set change request, an ACK for a QoS parameter set change request, and a NACK for a QoS parameter set change request, and the QoS parameter change indicator indicates whether a QoS parameter set will be changed.

In accordance with a further aspect of the present invention, an apparatus for receiving an SSSCH in a wireless communication system is provided. The apparatus includes a signal I/O unit for receiving the SSSCH including minimum grant delay information indicating a minimum delay of a requested grant and BR size information indicating a size of a BR.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the present exemplary embodiments, a wireless communication system is a centralized wireless communication system in which a Base Station (BS) is responsible for all resource allocations. In addition, an Institute of Electrical and Electronics Engineers (IEEE) 802.16m system is taken as the wireless communication system, by way of example. However, the present invention is not limited thereto, and the present invention is applicable to any wireless communication system that manages resources in a centralized manner and other similar communication systems.

As stated before, two methods are employed in order to change a Quality of Service (QoS) parameter set corresponding to a resource allocation scheme in the IEEE 802.16m system. The first method is a Mobile Station (MS)-initiated or Advanced MS (AMS)-initiated adaptation and the second method is BS-initiated or Advanced BS (ABS)-initiated adaptation.

A description will first be given of the MS-initiated adaptation of the QoS parameter set in the IEEE 802.16m system.

Figure 1:
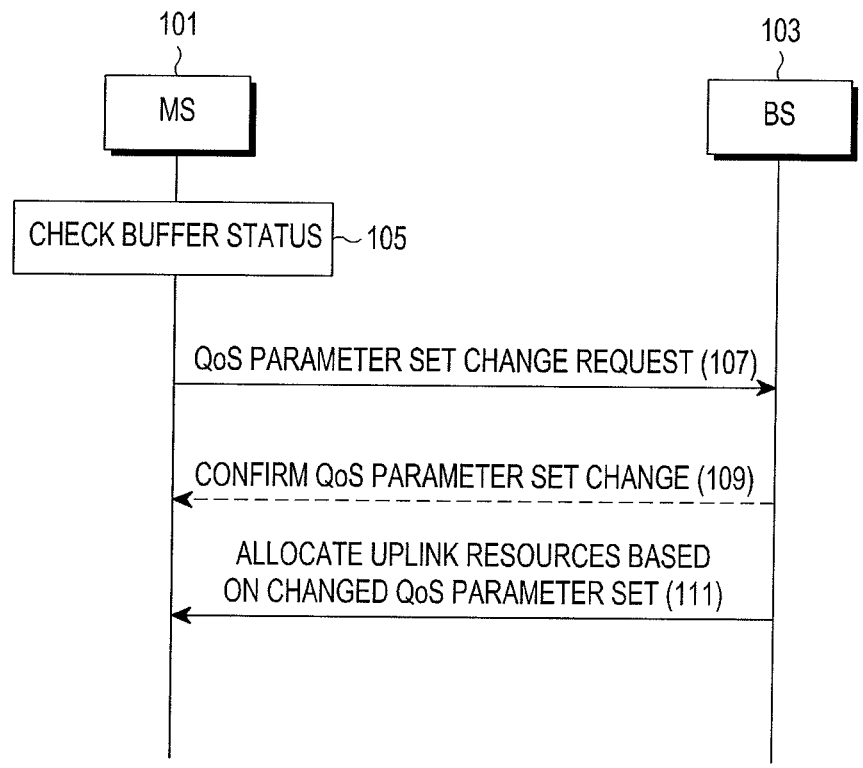
FIG. 1 is a diagram illustrating a message flow between a Base Station (BS) and a Mobile Station (MS) for an MS-initiated operation for changing a resource allocation scheme in a wireless communication system according to an exemplary embodiment of the present invention.

FIG. 1 is a diagram illustrating a message flow between a BS and an MS for an MS-initiated operation for changing a resource allocation scheme in a wireless communication system according to an exemplary embodiment of the present invention.

Referring to FIG. 1, an MS 101 that transmits uplink data in resources allocated according to an adaptive Grant Polling (aGP) service checks a buffer status in step 105. When the MS 101 determines that it is necessary to change a QoS parameter set according to the buffer status, the MS 101 transmits a QoS parameter set change request message to a BS 103 in step 107. The QoS parameter set is an exemplary resource allocation scheme that specifies an amount of allocated resources, a resource allocation period and other similar parameters. In the present exemplary embodiment, the QoS parameter set change request message is an example of a resource allocation scheme change request message. However, the present invention is not limited thereto, and various types of messages may be used as the resource allocation scheme change request message.

Upon receipt of the QoS parameter set change request message, in step 109, the BS 103 replies to the MS 101 with a confirmation message in order to confirm the QoS parameter set change request. The confirmation message includes information about the resource allocation scheme (i.e., the QoS parameter set) to be used for a later resource allocation. Then the BS 103 allocates uplink resources to the MS 101 according to the changed QoS parameter set in step 111.

As noted, another QoS parameter set adaptation method in the IEEE 802.16m system is the BS-initiated adaptation of the QoS parameter set for resource allocation, which will be described below.

In the case where the BS fails to receive data from the MS through uplink resources allocated to the MS according to a current QoS parameter set by the BS or the case where BS receives a message requesting additional resources for uplink data transmission from the MS, the BS autonomously initiates a change in the QoS parameter set.

In the BS-initiated QoS parameter set adaptation, an MS which is setting up a connection with the BS may malfunction without being informed of the BS-initiated QoS parameter set adaptation. For example, it is assumed that the BS initiates the change to the QoS parameter set due to a failure to receive uplink data from the MS through the uplink resources allocated by the BS.

If an error occurs in data that the MS transmits to the BS, the data being transmitted according to a primary QoS parameter set representing a resource allocation scheme suitable for a service that often transmits a large amount of data, then the BS fails to receive the data from the MS. However, the BS cannot determine whether the data reception failure is due to a transmission error during transmission of the data or due to a non-transmission of data from the MS to the BS. The BS then allocates a reduced amount of resources to the MS by changing the current resource allocation scheme to another resource allocation scheme because the BS determines that the resources allocated to the MS according to the existing QoS parameter set are not utilized by the MS. For instance, the BS may allocate sparse uplink resources to the MS by switching the current primary QoS parameter set to a secondary QoS parameter set.

However, if the cause of the BS's reception failure is a transmission error during the transmission of the data, the MS still needs resource allocation based on the primary QoS parameter set. Accordingly, the MS accumulates uplink data in its buffer but does not transmit the uplink data. This malfunction occurs because the MS is not aware of the BS's adaptation of a QoS parameter set, that is, the BS-initiated QoS parameter set adaption is performed without negotiation between the BS and the MS.

Figure 2:
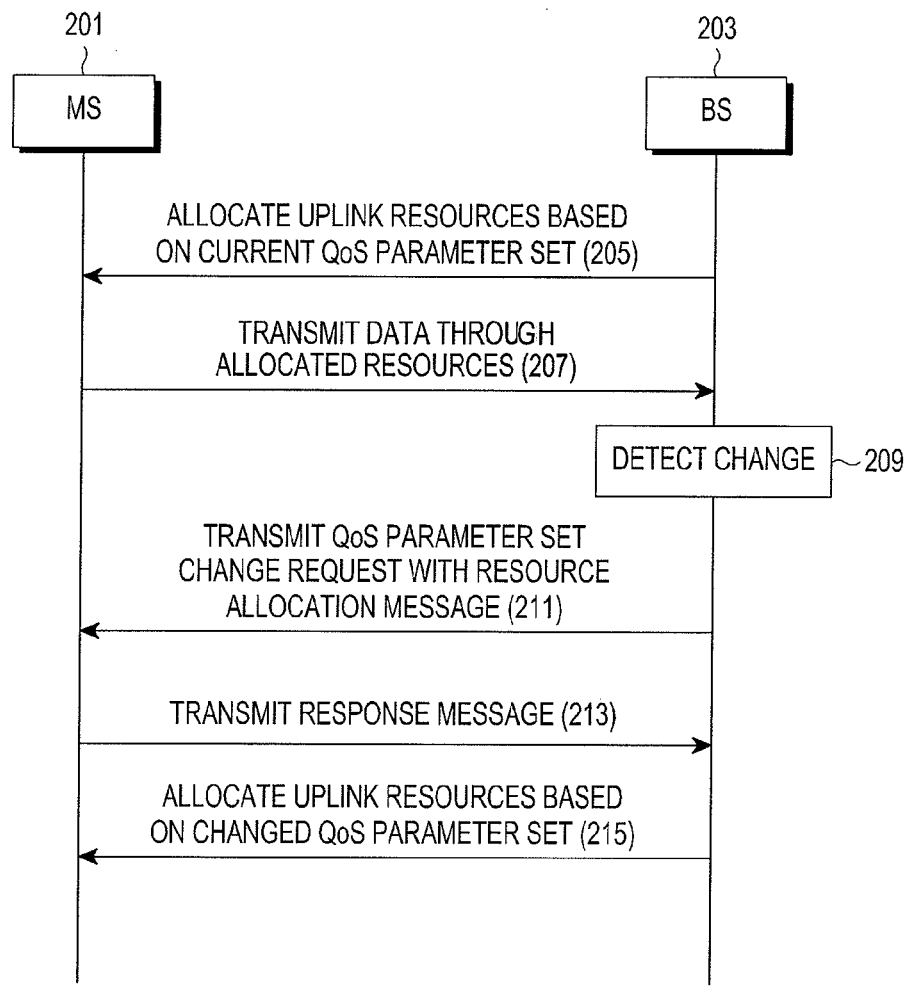
FIG. 2 is a diagram illustrating a message flow between a BS and a MS for a BS-initiated operation for changing a resource allocation scheme in a wireless communication system according to an exemplary embodiment of the present invention.

FIG. 2 is a diagram illustrating a message flow between a BS and a MS for a BS-initiated operation for changing a resource allocation scheme in a wireless communication system according to an exemplary embodiment of the present invention.

Referring to FIG. 2, a BS 203 allocates uplink resources to an MS 201 based on a current QoS parameter set in step 205. In step 207, the MS 201 transmits data through the allocated uplink resources to the BS 203. If the BS 203 fails to receive data from the MS 201 through the allocated uplink resources or if the BS 203 detects a change such as reception of a message requesting additional resources from the MS 201 in step 209, then the BS 203 determines that the resources allocated to the MS 201 are to be changed. Then the BS 203 transmits a QoS parameter set change request with resource allocation message to the MS 201 in step 211.

Upon reception of the QoS parameter set change request with resource allocation message, the MS 201 determines whether it is necessary to change the current QoS parameter set and transmits a response message for the QoS parameter set change request with resource allocation message to the BS 203 in step 213. Upon receipt of the response message, the BS 203 changes the QoS parameter set and allocates uplink resources to the MS according to the changed QoS parameter set in step 215. That is, the BS 203 may determine that the MS has agreed on the QoS parameter set adaptation when it receives the response message from the MS after step 213, and thus may change the resource allocation scheme, thereby preventing a malfunction that might otherwise take place due to an incorrect resource allocation scheme adaptation.

The response message transmitted by the MS 201 may be an ACKnowledgment (ACK) or Negative ACK (NACK) message. The BS 203 may change the QoS parameter set after receiving the ACK message from the MS 201. That is, upon receipt of the NACK message from the MS 201, the BS 203 can be sure that the MS 201 disagrees with the QoS parameter set adaptation. Therefore, the malfunction that may be due to the incorrect resource allocation scheme adaptation can be prevented.

The QoS parameter set change request message may contain resource allocation information allowing for the MS 201 to transmit the response message to the BS 203. For example, the resource allocation information may specify Least Significant Bits (LSBs) of a frame number index of resources allocated for uplink transmission of the response message. Since the response message is an uplink message, uplink resources should be allocated for transmission of the response message. When transmitting the QoS parameter set change request message to the MS, the BS allocates resources for a response message and expects to receive the response message from the MS, and thus includes information about the allocated resources (i.e., resource allocation information) in the request message. Then the MS can immediately acquire the resource allocation information needed for transmission of the response message and transmit the response message based on the resource allocation information. This obviates a need for an additional procedure for requesting resources for transmission of the response message, that is, an additional procedure for transmitting a resource request signal to the BS by the MS and allocating resources to the MS and transmitting resource allocation information to the MS by the BS.

Each of the QoS parameter set change request message and a response message for the QoS parameter set change request message may take the form of a Service Specific Scheduling Control Header (SSSCH). A description of features of the SSSCH will be given below.

Table 1 illustrates a format of an SSSCH message according to an exemplary embodiment of the present invention.

TABLE 1

| Syntax | Size (bits) | Description |
| --- | --- | --- |
| Service Specific Scheduling Control Header( ) { | | |
| FID | 4 | Flow identifier. Set to 0001. |
| Type | 5 | MAC signaling header type = 0b00010 |
| Length | 3 | Indicates the length of the signaling header in bytes |
| BR Type | 1 | Indicates whether the requested bandwidth is incremental or aggregate. 0: aggregate 1: incremental |
| BR Size | 19 | Bandwidth request size in bytes |
| BR FID | 4 | The FID for which the uplink bandwidth is requested |
| if (scheduling type == aGPService) { | | |
| QoS parameter change indicator | 1 | QoS parameter change indicator 0: no change in QoS parameter 1: having changes in QoS parameter |
| SCID change indicator | 1 | Sleep Cycle Identifier (SCID) change indicator |
| SSSCH type | 2 | Indicates the type of the SSSCH 0b00: request 0b01: ACK (request accepted) 0b10: NACK (request rejected) 0b11: reserved |
| If (SSSCH type == 0b00 &&SSSCH is sent by an ABS) { | | |
| LSB of frame number index | 6 | 6 LSBs of the frame number index of uplink resources allocated for an SSSCH ACK/NACK message |
| } If (SSSCH == 0b00) { if (QoS parameter change indicator = 1) { | | |
| Running Grant Polling Interval (GPI) | 6 | Indicates a new GPI (resource allocation interval) (frames) to use for future allocation. |
| } else { QoS parameter set switch | 1 | 0: primary QoS parameter set 1: secondary QoS parameter set |
| } } If (SCID change indicator == 1) { | | |
| SCID | 4 | Sleep cycle identifier |
| } } else if (scheduling type == BE) { | | |
| Minimum grant delay | 6 | Indicates minimum delay (frames) of the requested grant. |
| } Padding | Variable | Filled with 0s so that the total length of this header is 6 bytes |
| } | | |

SSSCH messages are exchanged between a BS and an MS for a purpose of resource allocation. That is, each SSSCH message includes the attributes of FID, Type, Length, BR type, BR size, and BR FID. If the MS uses aGP service-type resource allocation, the SSSCH message includes the attributes of QoS Parameter change indicator, SCID change indicator, and SSSCH type. When the SSSCH message is a QoS parameter change request message transmitted by the BS, the SSSCH message selectively includes the attribute of LSB of frame number index. Further, the SSSCH message may include the attributes of Running Grant Polling Interval, QoS parameter set switch, SCID, Minimum grant delay, and Padding.

The SSSCH type indicates whether the SSSCH is used as a request message or a response message. That is, the SSSCH message described in Table 1 can be used in the case where the MS requests a change in a QoS parameter set, as illustrated in FIG. 1, and in the case where the BS requests a change in a QoS parameter set, as illustrated in FIG. 2. That is, when the BS or the MS requests the change of a QoS parameter set, the BS or the MS transmits an SSSCH with the SSSCH type set to '0b00'. As a response message for the received SSSCH, an SSSCH having the SSSCH type set to '0b01' in order to accept the request or an SSSCH having the SSSCH type set to '0b10' to reject the request is transmitted.

When the SSSCH message is used as a request message by which the BS requests the change of a QoS parameter set, the SSSCH message includes the LSB of the frame number index. The LSB of the frame number index provides resource allocation information used for transmitting an SSSCH message on the uplink as a response message for the request message. In Table 1, BE represents Best Effort and MAC represents Medium Access Control.

A description of other attributes included in the SSSCH will not be provided herein for the purpose of brevity.

Figure 3:
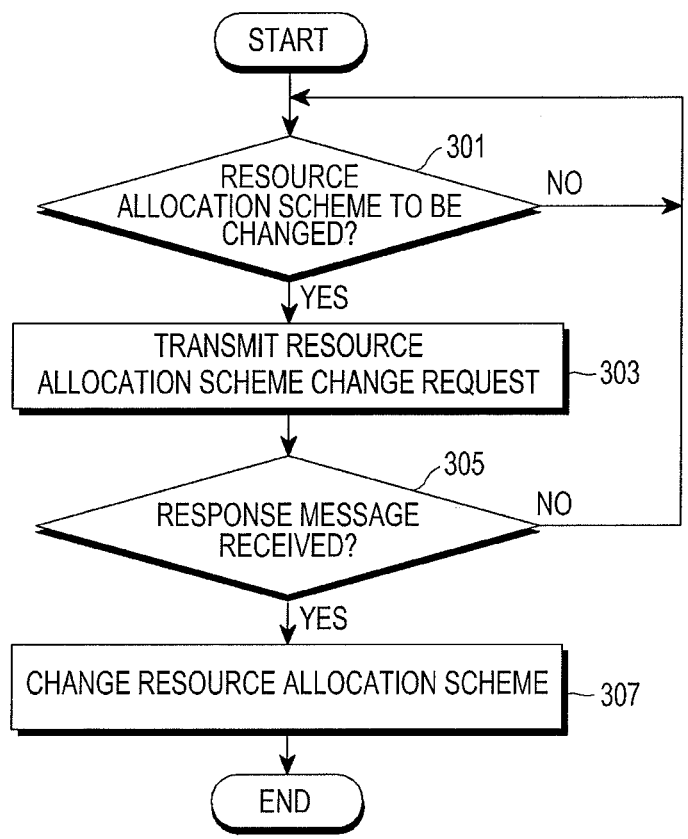
FIG. 3 is a flowchart illustrating a resource allocation method of a BS in a wireless communication system according to an exemplary embodiment of the present invention.

FIG. 3 is a flowchart illustrating a resource allocation method of a BS in a wireless communication system according to an exemplary embodiment of the present invention.

Referring to FIG. 3, the BS determines whether to change a resource allocation scheme during communication with the MS in step 301. For example, upon detection of a change, such as reception of no data from the MS through allocated resources or reception of a message requesting additional resources from the MS, the BS determines that the resource allocation scheme is to be changed.

After determining that the resource allocation scheme is to be changed, the BS transmits a resource allocation scheme change request message to the MS in step 303. Selectively, if the BS is providing an aGP service in the IEEE 802.16m system, it may transmit a QoS parameter set change request message to the MS, wherein the QoS parameter set change request message may be configured in the form of an SSSCH message.

The BS waits for a response message responding to the request message from the MS in step 305. Upon receipt of the response message from the MS, the BS changes the resource allocation scheme, determining that the MS has acknowledged the change of the resource allocation scheme, and allocates resources to the MS according to the changed resource allocation scheme in step 307.

Figure 4:
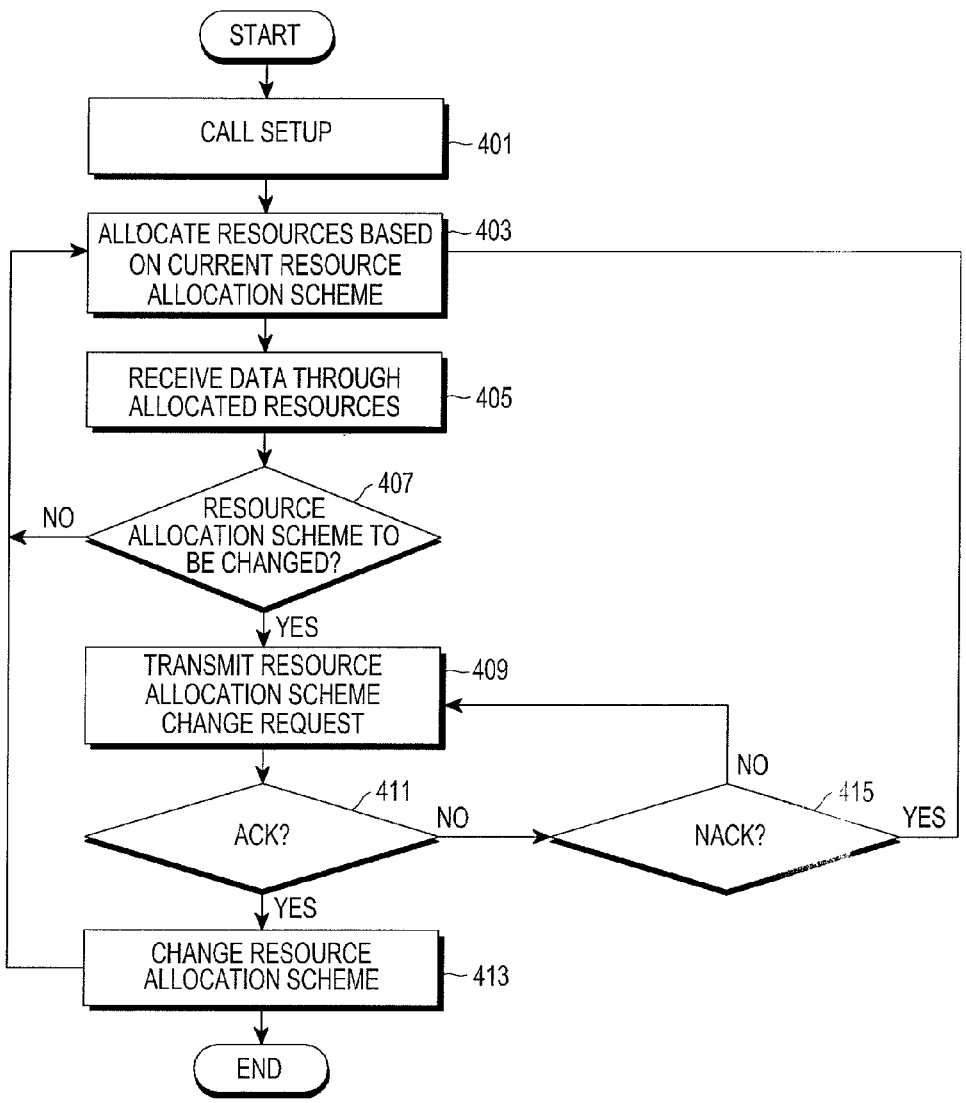
FIG. 4 is a flowchart illustrating a resource allocation method of a BS in a wireless communication system according to another exemplary embodiment of the present invention.

FIG. 4 is a flowchart illustrating a resource allocation method of a BS in a wireless communication system according to another exemplary embodiment of the present invention.

Referring to FIG. 4, the BS performs a call setup with the MS in step 401. In the present exemplary embodiment, the BS may be providing an aGP service using a plurality of QoS parameter sets as resource allocation schemes in the IEEE 802.16m system. Next, the BS allocates uplink resources to the MS according to a current resource allocation scheme in step 403.

The BS receives data from the MS through the allocated uplink resources in step 405 and then determines whether to change the resource allocation scheme based on the received data in step 407. For example, if the BS detects a change such as the absence of user data in the received data or reception of a message requesting additional resources from the MS, then the BS determines that the resource allocation scheme is to be changed.

On the contrary, if the BS determines that it is not necessary to change the resource allocation scheme, then the BS returns to step 403 in order to allocate resources according to the current resource allocation scheme. Upon determining that it is necessary to change the resource allocation scheme, the BS transmits a resource allocation scheme change request message to the MS in step 409. Because the BS expects to receive a response message (i.e., an ACK or NACK message) from the MS in response to the request message, the BS allocates uplink resources to the MS for the response message in advance, and includes resource allocation information about the allocated uplink resources for the transmission of the expected response message in the request message.

The BS awaits reception of the response message from the MS in steps 411 and 415. Upon receipt of an ACK message as the response message, the BS changes the resource allocation scheme in step 413 and allocates resources according to the changed resource allocation scheme requested in step 409. On the other hand, upon receipt of a NACK message as the response message, the BS allocates resources according to the current resource allocation scheme in step 403. Meanwhile, if the BS has not received the response message, such as the ACK message or the NACK message, after a predetermined amount of time, then the BS retransmits the resource allocation scheme change request message to the MS, determining that the BS has failed to receive the response message in step 409 and then the BS awaits reception of a response message in response to the request message.

The BS may include a resource allocation controller for managing all resource allocations and a wireless signal processor for processing wireless transmission and reception signals. The operations illustrated in FIGS. 3 and 4 may be implemented in the resource allocation controller of the BS. The resource allocation controller may include a controller and a signal Input/Output (I/O) unit. The controller provides overall control to the resource allocation methods of FIGS. 3 and 4 and the signal I/O unit receives and outputs a plurality of messages and data from and to the controller. Therefore, the BS may serve as both an SSSCH transmitter and an SSSCH receiver.

Figure 5:
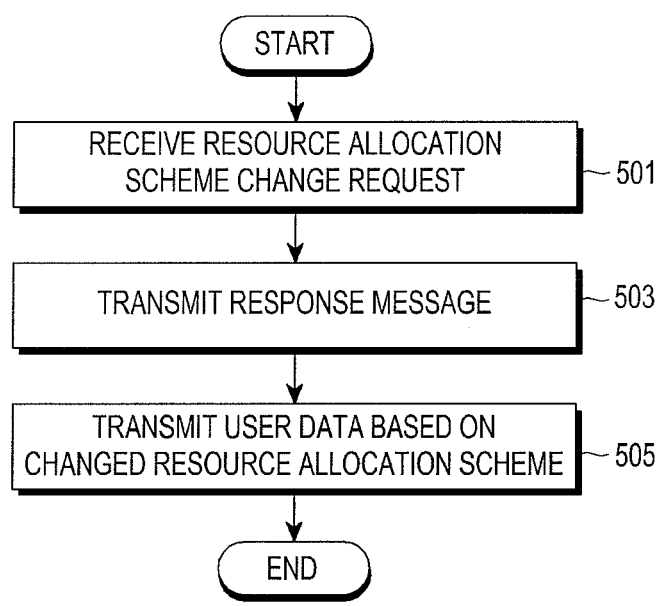
FIG. 5 is a flowchart illustrating a resource allocation method of a MS in a wireless communication system according to an exemplary embodiment of the present invention.

FIG. 5 is a flowchart illustrating a resource allocation method of a MS in a wireless communication system according to an exemplary embodiment of the present invention.

Referring to FIG. 5, the MS receives a resource allocation scheme change request message from the BS during call setup with the BS in step 501. The MS may receive an aGP service using a plurality of QoS parameter sets as resource allocation schemes in the IEEE 802.16m system. However, aspects of the present invention are not limited thereto, and other suitable resource allocation schemes may be used.

The MS transmits a response message in response to the received request message to the BS in step 503. Upon receipt of the response message, the BS allocates resources to the MS according to a new resource allocation scheme, determining that the MS has agreed to change the resource allocation scheme. Therefore, the MS transmits uplink user data through the resources allocated according to the new resource allocation scheme indicated by the resource allocation scheme change request message in step 505.

Figure 6:
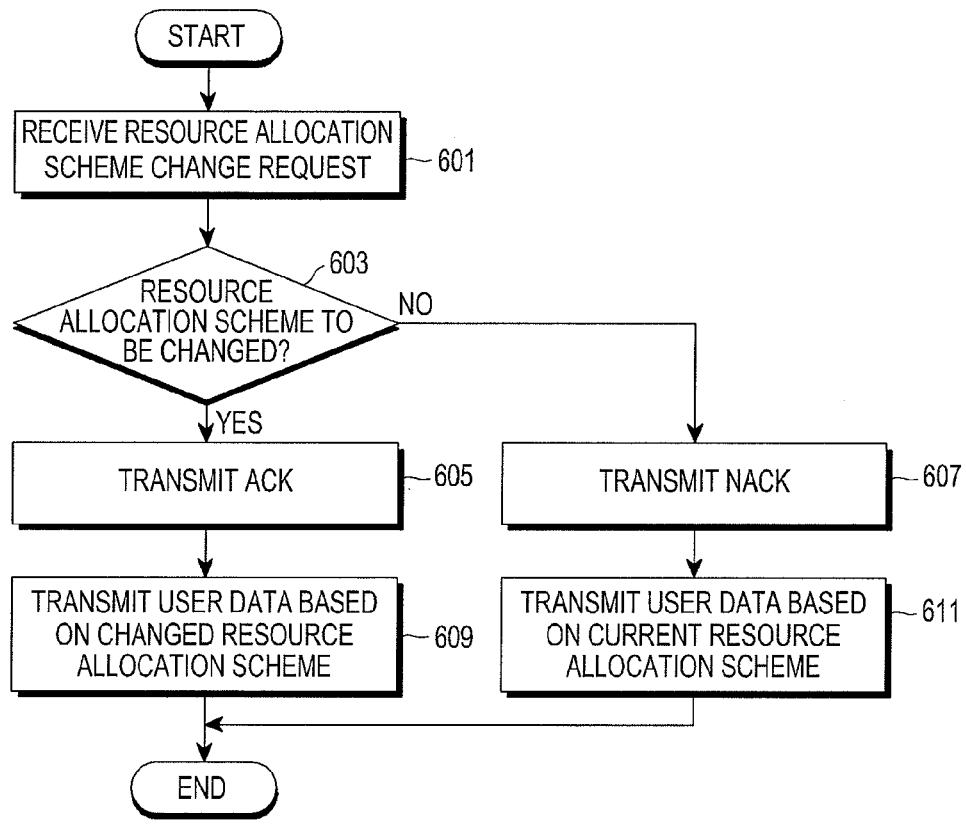
FIG. 6 is a flowchart illustrating a resource allocation method of a MS in a wireless communication system according to another exemplary embodiment of the present invention.

FIG. 6 is a flowchart illustrating a resource allocation method of a MS in a wireless communication system according to another exemplary embodiment of the present invention.

Referring to FIG. 6, the MS receives a resource allocation scheme change request message from the BS during a call setup with the BS in step 601. The MS may receive an aGP service using a plurality of QoS parameter sets as resource allocation schemes in the IEEE 802.16m system.

The request message contains information about a new resource allocation scheme requested by the BS. Hence, upon receipt of the request message, the MS determines whether the resource allocation scheme is to be changed to the new resource allocation scheme requested by the BS, taking into account a current service type, a buffer status, the amount of data being transmitted, and other similar factors in step 603.

If the MS determines to change to the new resource allocation scheme, the MS transmits an ACK message in response to the request message to the BS in step 605. Then the MS transmits user data to the BS through resources allocated according to the new resource allocation scheme in step 609.

On the other hand, if the MS determines to not change to the new resource allocation scheme, then the MS transmits a NACK message to the BS in response to the request message in step 607 and transmits user data to the BS through resources allocated according to a current resource allocation scheme in step 611.

Selectively, the MS transmits the response message in uplink resources indicated by resource allocation information included in the request message in steps 605 and 607. The resource allocation information describes uplink resources that the BS has already allocated for transmission of the response message.

Although not required in all aspects of the present invention, the MS may include a controller for managing an overall operation of data communication and a signal I/O unit for processing wireless transmission and reception signals. The operations of FIGS. 5 and 6 may be implemented in the controller of the MS. The controller provides overall control to the resource allocation methods of FIGS. 5 and 6 and the signal I/O unit receives and outputs a plurality of messages and data from and to the controller. Therefore, the MS may serve as both an SSSCH transmitter and an SSSCH receiver.

The message flows illustrated in FIGS. 1 and 2 and the flowcharts illustrated in FIGS. 3 to 6 should not be construed as limiting the scope and spirit of the present invention. The resource allocation methods of FIGS. 3 to 6 are exemplary implementations of operations of a controller (not shown) and an MS. These methods may not involve all steps or may not be performed individually by a particular device. Additionally, the methods may be implemented by a single device or component.

The aforementioned operations can be performed by providing a memory that stores program code in a component of a controller or an MS. That is, each component of the controller or the MS can perform the operations by reading the program code from the memory by means of a processor or a Central Processing Unit (CPU) and executing the program code.

As is apparent from the above description of exemplary embodiments of the present invention, when a BS changes an uplink resource allocation scheme for an MS, the uplink resource allocation scheme adaptation can be negotiated between the MS and the BS. Therefore, a malfunction of the BS and the MS, such as insufficient resource allocation or unnecessary resource allocation, can be prevented.

In addition, when a BS changes an uplink resource allocation scheme for an MS in a wireless communication system, in advance the BS notifies the MS of uplink resources for transmission of a response message responding to the resource allocation scheme change notification, thereby obviating a need for an additional message exchange for resource allocation. As a consequence, the resource allocation procedure is simplified.

The message proposed herein may also available when the MS requests a resource allocation scheme. Thus, both the BS and the MS can request the change of a resource allocation scheme using the proposed message. Accordingly, resource allocation changes can be efficient.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a service specific scheduling control header (SSSCH) in a wireless communication system, the method comprising:
    transmitting the SSSCH including SSSCH type information, a quality of service (QoS) parameter change indicator, and a frame number,
    wherein the SSSCH type information indicates that a base station (BS) requests a mobile station (MS) to change a QoS parameter set,
    wherein the QoS parameter change indicator indicates that the QoS parameter set will be changed, or QoS parameter set selection,
    wherein the frame number indicates a frame number where the MS transmits acknowledgement (ACK)/negative ACK (NACK) for the request for the change of QoS parameter set to the BS,
    wherein the ACK is transmitted to acknowledge the QoS parameter set and the NACK is transmitted to reject the QoS parameter set, and
    wherein the SSSCH further includes flow identifier (FID) information, type information indicating a medium access control (MAC) signaling header type, and length information indicating a length of a signaling header.

2. The method of claim 1, wherein the SSSCH further includes a sleep cycle identifier (SCID) change indicator indicating whether a SCID will be changed.

3. The method of claim 2, wherein if the SCID change indicator indicates that the SCID will be changed, the SSSCH further includes SCID information.

4. The method of claim 1, wherein, if the QoS parameter change indicator indicates that the QoS parameter set will be changed, the SSSCH further includes new grant polling interval (GPI) information for use in future resource allocation.

5. The method of claim 1, wherein, if the QoS parameter change indicator indicates the QoS parameter set selection, the SSSCH further includes QoS parameter set selection information indicating one of a primary QoS parameter set and a secondary QoS parameter set.

6. The method of claim 1, wherein the transmitting of the SSSCH is executed when the wireless communication system provides an adaptive grant polling (aGP) service.

7. A method for receiving a service specific scheduling control header (SSSCH) in a wireless communication system, the method comprising:
    receiving the SSSCH including SSSCH type information, a quality of service (QoS) parameter change indicator, and a frame number,
    wherein the SSSCH type information indicates that a base station (BS) requests a mobile station (MS) to change a QoS parameter set,
    wherein the QoS parameter change indicator indicates that the QoS parameter set will be changed, or QoS parameter set selection,
    wherein the frame number indicates a frame number where the MS transmits acknowledgement (ACK)/negative ACK (NACK) for the request for the change of QoS parameter set to the BS,
    wherein the ACK is transmitted to acknowledge the QoS parameter set and the NACK is transmitted to reject the QoS parameter set, and
    wherein the SSSCH further includes flow identifier (FID) information, type information indicating a medium access control (MAC) signaling header type, and length information indicating a length of a signaling header.

8. The method of claim 7, wherein the SSSCH further includes a sleep cycle identifier (SCID) change indicator indicating whether a SCID will be changed.

9. The method of claim 8, wherein if the SCID change indicator indicates that the SCID will be changed, the SSSCH further includes SCID information.

10. The method of claim 7, wherein, if the QoS parameter change indicator indicates that the QoS parameter set will be changed, the SSSCH further includes new grant polling interval (GPI) information for use in future resource allocation.

11. The method of claim 7, wherein, if the QoS parameter change indicator indicates the QoS parameter set selection, the SSSCH further includes QoS parameter set switch information indicating one of a primary QoS parameter set and a secondary QoS parameter set.

12. The method of claim 7, wherein the receiving of the SSSCH is executed when the wireless communication system provides an adaptive grant polling (aGP) service.

13. An apparatus for transmitting a service specific scheduling control header (SSSCH) in a wireless communication system, the apparatus comprising:
    a transmitter configured to transmit the SSSCH including SSSCH type information, a quality of service (QoS) parameter change indicator, and a frame number,
    wherein the SSSCH type information indicates that a base station (BS) requests a mobile station (MS) to change a QoS parameter set,
    wherein the QoS parameter change indicator indicates that the QoS parameter set will be changed, or QoS parameter set selection,
    wherein the frame number indicates a frame number where the MS transmits acknowledgement (ACK)/negative ACK (NACK) for the request for the change of QoS parameter set to the BS,
    wherein the ACK is transmitted to acknowledge the QoS parameter set and the NACK is transmitted to reject the QoS parameter set, and
    wherein the SSSCH further includes flow identifier (FID) information, type information indicating a medium access control (MAC) signaling header type, and length information indicating a length of a signaling header.

14. The apparatus of claim 13, wherein the SSSCH further includes a sleep cycle identifier (SCID) change indicator indicating whether a SCID will be changed.

15. The apparatus of claim 14, wherein if the SCID change indicator indicates that the SCID will be changed, the SSSCH further includes SCID information.

16. The apparatus of claim 13, wherein, if the QoS parameter change indicator indicates that the QoS parameter set will be changed, the SSSCH further includes new grant polling interval (GPI) information for use in future resource allocation.

17. The apparatus of claim 13, wherein, if the QoS parameter change indicator indicates the QoS parameter set selection, the SSSCH further includes QoS parameter set selection information indicating one of a primary QoS parameter set and a secondary QoS parameter set.

18. The apparatus of claim 13, wherein the transmitter transmits the SSSCH when the wireless communication system provides an adaptive grant polling (aGP) service.

19. An apparatus for receiving a service specific scheduling control header (SSSCH) in a wireless communication system, the apparatus comprising:
  a receiver configured to receive the SSSCH including SSSCH type information, a quality of service (QoS) parameter change indicator, and a frame number,
  wherein the SSSCH type information indicates that a base station (BS) requests a mobile station (MS) to change a QoS parameter set, wherein the QoS parameter change indicator indicates that the QoS parameter set will be changed, or QoS parameter set selection,
  wherein the frame number indicates a frame number where the MS transmits acknowledgment (ACK)/negative ACK (NACK) for the request for the change of QoS parameter set to the BS,
  wherein the ACK is transmitted to acknowledge the QoS parameter set and the NACK is transmitted to reject the QoS parameter set, and
  wherein the SSSCH further includes flow identifier (FID) information, type information indicating a medium access control (MAC) signaling header type, and length information indicating a length of a signaling header.

20. The apparatus of claim 19, wherein the SSSCH further includes a sleep cycle identifier (SCID) change indicator indicating whether a SCID will be changed.

21. The apparatus of claim 20, wherein if the SCID change indicator indicates that the SCID will be changed, the SSSCH further includes SCID information.

22. The apparatus of claim 19, wherein, if the QoS parameter change indicator indicates that the QoS parameter set will be changed, the SSSCH further includes new grant polling interval (GPI) information for use in future resource allocation.

23. The apparatus of claim 19, wherein, if the QoS parameter change indicator indicates the QoS parameter set selection, the SSSCH further includes QoS parameter set switch information indicating one of a primary QoS parameter set and a secondary QoS parameter set.

24. The apparatus of claim 19, wherein the receiver receives the SSSCH when the wireless communication system provides an adaptive grant polling (aGP) service.

25. The method of claim 7, further comprising:
  transmitting the ACK/NACK for the request for the change of QoS parameter set to the BS.

26. The apparatus of claim 19, further comprising:
  a transmitter configured to transmit the ACK/NACK for the request for the change of QoS parameter set to the BS.

\* \* \* \* \*